US012706006B2

(12) United States Patent
Rössl et al.

(10) Patent No.: US 12,706,006 B2
(45) Date of Patent: Aug. 11, 2026

(54) LOCATING A DEVICE ON A SHELF RAIL

(71) Applicants: VusionGroup GmbH, Fernitz-Mellach (AT); VusionGroup SA, Fernitz-Mellach (AT)

(72) Inventors: Andreas Rössl, Fernitz-Mellach (AT); Nikola Gmajnic, Fernitz-Mellach (AT)

(73) Assignees: VusionGroup GmbH, Fernitz-Mellach (AT); VusionGroup SA, Nanterre (FR)

( * ) Notice: Subject to any disclaimer, the term of this patent is extended or adjusted under 35 U.S.C. 154(b) by 335 days.

(21) Appl. No.: 18/549,624

(22) PCT Filed: Mar. 5, 2022

(86) PCT No.: PCT/EP2022/055654
§ 371 (c)(1),
(2) Date: Sep. 8, 2023

(87) PCT Pub. No.: WO2022/189314
PCT Pub. Date: Sep. 15, 2022

(65) Prior Publication Data

US 2024/0185744 A1 Jun. 6, 2024

(30) Foreign Application Priority Data

Mar. 9, 2021 (WO) ................. PCT/EP2021/055914
Mar. 9, 2021 (WO) ................. PCT/EP2021/055916
Dec. 16, 2021 (WO) ................. PCT/EP2021/086144

(51) Int. Cl.
*G09F 3/20* (2006.01)

(52) U.S. Cl.
CPC .............. *G09F 3/208* (2013.01); *G09F 3/204* (2013.01)

(58) Field of Classification Search
CPC ................................ G09F 3/208; G09F 3/204
See application file for complete search history.

(56) References Cited

U.S. PATENT DOCUMENTS 5,374,815 A * 12/1994 Waterhouse ........... G06Q 30/02 235/383
2002/0034067 A1* 3/2002 Massaro .............. A47F 5/0068 361/728

(Continued)

FOREIGN PATENT DOCUMENTS

CN 109863518 A 6/2019
JP 2001-161522 A 6/2001

(Continued)

OTHER PUBLICATIONS

International search report from WO Publication WO 2022/189314 A1 the Parent of the present application.

(Continued)

*Primary Examiner* — Gary C Hoge
(74) *Attorney, Agent, or Firm* — Studebaker Brackett PLLC

(57) ABSTRACT

Shelf-rail system comprising one shelf rail and at least one shelf-rail device attached to the shelf rail, wherein the shelf rail system comprises at least one sensor that is provided and designed to automatically determine the position of at least one shelf-rail device attached to the shelf rail along the longitudinal extension of the shelf rail and/or to automatically determine the sequential order of at least two shelf-rail devices attached to the shelf rail along the longitudinal extension of the shelf rail.

20 Claims, 3 Drawing Sheets

(56) References Cited

U.S. PATENT DOCUMENTS

| | | | | |
|---|---|---|---|---|
| 2014/0316944 | A1* | 10/2014 | Kim | G06Q 10/30<br>705/26.61 |
| 2017/0139032 | A1* | 5/2017 | Rößl | G01S 5/02213 |
| 2018/0151052 | A1* | 5/2018 | Taylor | G08B 25/08 |
| 2018/0268745 | A1* | 9/2018 | de Haas | H01R 25/145 |
| 2019/0080633 | A1* | 3/2019 | Bottine | G06F 3/147 |
| 2022/0237392 | A1* | 7/2022 | Rössl | H04W 4/023 |
| 2022/0360695 | A1* | 11/2022 | Schwarz | H04N 23/57 |
| 2023/0042843 | A1* | 2/2023 | Rössl | G09G 3/2096 |

FOREIGN PATENT DOCUMENTS

| | | | |
|---|---|---|---|
| JP | 2013-183929 | A | 9/2013 |
| WO | 9305485 | A1 | 3/1993 |
| WO | 2021/032278 | A1 | 2/2021 |
| WO | 2022/189314 | A1 | 9/2022 |

OTHER PUBLICATIONS

An Office Action mailed by China National Intellectual Property Administration on Nov. 28, 2025, which corresponds to Chinese Patent Application No. 202280020222.2 and is related to U.S. Appl. No. 18/549,624.

An Office Action issued by the National Office of Intellectual Property of Vietnam, dated Dec. 22, 2025, which corresponds to Vietnamese Patent Application No. 2-2023-00595, and is related to U.S. Appl. No. 18/549,624.

An Office Action, “Notice of Reasons for Refusal,” mailed by the Japanese Patent Office on Nov. 26, 2025, which corresponds to Japanese Patent Application No. 2023-555454 and is related to U.S. Appl. No. 18/549,624; with English language translation.

Office Action issued in KR 10-2023-7034508; mailed by the Korean Intellectual Property Office on Apr. 13, 2026.

* cited by examiner

LOCATING A DEVICE ON A SHELF RAIL

CROSS-REFERENCE TO RELATED APPLICATIONS

This is a 35 U.S.C. 371 National Stage Patent Application of International Application No. PCT/EP2022/055654, filed Mar. 5, 2022, which is a continuation of each of the following applications PCT/EP2021/055914 filed Mar. 9, 2021, PCT/EP2021/055916 filed Mar. 9, 2021 and PCT/EP2021/086144 filed Dec. 16, 2021 all of which are hereby incorporated by reference in their entireties.

TECHNICAL FIELD

The invention relates to locating a device on a shelf rail.

BACKGROUND

In WO2017153481 A1, a shelf-rail system with a shelf rail is disclosed, which allows an electronic display device to be attached to the grid.

In the case of this well-known shelf-rail system, it has proven to be unfavourable that the exact position of the display device must be detected manually in order to make the position accessible to further electronic processing, e.g., in a planogram, etc.

The object of the invention therefore relates to providing an improved shelf-rail system in which the disadvantages mentioned above are avoided.

SUMMARY OF THE INVENTION

This task is solved by a shelf-rail system according to claim 1. The object of the invention is therefore to provide a shelf-rail system comprising a shelf rail and at least one shelf-rail device attached to the shelf rail, wherein the shelf-rail system comprises at least one sensor that is provided and designed to automatically determine the position of at least one shelf-rail device attached to the shelf rail along the longitudinal extension of the shelf rail and/or to automatically determine the sequential order of at least two shelf-rail devices attached to the shelf rail along the longitudinal extension of the shelf rail.

The measures according to the invention are accompanied by the advantage that the absolute position of a shelf-rail device held in the shelf rail or the relative position of such a device is fully automatically detected and made accessible to further computerized processing, i.e., electronic processing.

Furthermore, particularly favourable embodiments and further embodiments of the invention result from the dependent claims as well as the following description.

Preferably, the present invention finds its scope of application in a system of electronic shelf labels. The shelf rail is usually installed on the front edge of a shelf or other object used for product placement and is used to attach the electronic shelf labels that form shelf-rail devices. They are used to display product and/or price information and are usually referred to in specialist jargon as "Electronic Shelf Labels", or ESL for short. In such a system, the information to be displayed is transmitted to the respective ESL by a central control device, such as a server or a cloud-based application, wherein an electronic communication network between the ESLs and the central control device is used. The communication network can be radio-based or cable-based, or it can be in a mixed configuration. For example, ESL access points can be connected to the central control device via a LAN (Local Area Network) and a group of ESLs can be assigned to one of the ESL access points by radio. In this configuration, the ESLs can be addressed directly by radio.

However, devices with other functionalities can also be used as shelf-rail devices, which are designed, for example, to detect a temperature, to detect an image and/or video, or to detect a user interaction, etc.

However, it can also be provided that a further shelf-rail device, namely a shelf-rail control device forming a control or a central interface for each shelf rail, also referred to as a shelf-rail controller, is provided for each shelf rail, wherein the shelf-rail controller can communicate with the central control device in either a cable-based or radio-based manner, in particular, via the aforementioned communication network; however, within the shelf rail, the control system of the other shelf-rail devices attached to the shelf rail takes over, wherein this can be implemented in a radio-based but preferably cable-wired manner. Such a shelf-rail control device is positioned at the end of the shelf rail, i.e., on the left or right edge of the shelf rail.

An electrical supply of the shelf-rail devices can be provided with the aid of batteries individually installed in the shelf-rail devices or rechargeable batteries. A radio-based power provision can also take place, e.g., by means of "Power-over-Wi-Fi". The shelf-rail controller can also serve as a central power supply device for the shelf-rail devices attached to the front of the shelf rail, wherein the shelf-rail controller itself is supplied with power by means of a central battery, by means of power-over-Wi-Fi or even in a cable-wired manner.

In accordance with a first embodiment type, it has proven to be particularly favourable that the sensor is installed in the shelf-rail device and is designed to detect a coding element of the shelf rail, preferably a plurality of coding elements. The coding elements therefore extend along the longitudinal extension of the shelf rail and can be detected by a shelf-rail device that can essentially be positioned randomly along the shelf rail using the sensor at the respective position.

The coding element can be implemented by means of different embodiments, such as those listed in a non-exhaustive manner for example:

- as a location-specific coding element that can be optically detected, such as a QR code, wherein the QR code along the shelf rail is implemented in a position-specific manner and thus clearly indicates a specific position, or a site-specific bar or colour code, etc.
- as a coding element that changes the shape or structure of the shelf rail in a position-specific manner, such as a characteristic that changes the surface of the shelf rail, such as a site-specific engraving, etc., or site-specific recesses, recesses or holes, etc.
- as a coding element that changes gradually or (quasi-) continuously with regard to its electrical properties along the shelf rail, such as a resistance strip running along the longitudinal extension for example, which makes it possible to detect a different, site-specific resistance value depending on the position of its contact, or a site-specific design that leads to a site-specific capacitive or inductive property of the shelf rail, such as site-specific coating or also material thickness, etc.

The attachment or positioning of the respective coding element must be provided on the shelf rail in such a way that the respective coding element can be easily detected with the aid of the sensor installed in the shelf-rail device. Any area that is positioned directly adjacent to a shelf-rail device inserted into the shelf rail can be used as a positioning area on the shelf rail. This can be, for example, an upper bar, a lower bar or also the central wall of the shelf rail, which usually runs corresponding to the rear wall of the shelf-rail device inserted into the shelf rail.

If the shelf rail comprises an area adjacent to the shelf-rail device inserted into the shelf rail which is usually not or only with difficulty visible to a normally acting customer when the shelf rail is used as intended, such as a shaft open at the bottom into which the shelf-rail device is inserted in order to attach it to the shelf rail, it can be favourable that the coding element is placed there, thereby being hidden from the eyes of customers or even staff. The coding element positioned in this way is also safely stored there from environmental influences and potential damage.

Depending on the coding element used, it has proven to be favourable that the sensor is adapted to the coding element to be detected, i.e., specifically the sensor is designed for mechanical, electrical, in particular resistive or inductive or capacitive, or optical detection of the coding element or elements.

Sensors designed for optical detection can be implemented, for example, with the aid of a CCD sensor (CCD stands for "Charged Couples Device") or a combination of a light-emitting diode and a phototransistor.

Since the shelf-rail device positioned along the shelf rail covers the optically detectable coding element at its position, i.e., prevents or hinders the incidence of light on it, it can be favourable that the sensor or shelf-rail device comprises a illumination element (e.g., one or a plurality of LEDs) that is provided and aligned or positioned to illuminate the optically detectable coding element. If the optically detectable coding element on the back side of the shelf-rail device is detected with the aid of the sensor provided there, the illumination element will also illuminate the optically detectable coding element from the back side of the shelf-rail device. In this case, the back side is preferably designed in such a way that it does not lie directly against the shelf rail where the lighting and the detection of the coding element is to take place. This illumination element can be mounted on the back side of the shelf-rail device. However, the illumination element can also be mounted on the side of the shelf-rail device and from there illuminate the shelf rail extending behind the shelf-rail device. However, the sensor for detecting the section of the shelf rail extending laterally next to the shelf-rail device can also be aligned or positioned. In this case, it can, but does not have to do without the illumination element. However, if it is provided, it can be orientated in such a way that the area of the shelf rail adjacent to the shelf-rail device that is detected by the sensor is illuminated.

Sensors designed for mechanical detection can, for example, comprise a mechanical element that can be moved by the respective characteristic of the coding element, the offset of which is then electronically detected and further processed in the sensor. Torsion bars or strain gauges and the like can also be used for this purpose.

Sensors designed for electrical detection can be based, for example, on the detection of a value of an electrical resistance or its change, on the detection of an induction of a coil or a conductor loop or the change, or also on the detection of a capacitance of a capacitor or its change. Finally, a voltage-drop or current flow changed by inductive or capacitive action is detected.

However, in accordance with a special embodiment type, it has proven to be particularly favourable that the coding elements are formed by recesses in the shelf rail, especially in at least one shelf-rail wall, along the longitudinal extension of the shelf rail. This is a site-specific structural characteristic of the shelf rail along its longitudinal extension. The embodiment on a central wall of the shelf rail has proven to be particularly favourable, which is, in any case, positioned directly adjacent to a shelf-rail device inserted in the shelf rail, and can even be provided for contact with or in contact with the shelf-rail device where applicable. This ensures safe and reliable detection of the coding elements with the sensor of the shelf-rail device.

In this context, it has also proven to be favourable that the recesses are formed in a grid. This has the advantage that the coding elements are always positioned at equal distances from each other along the longitudinal extension of the shelf rail.

It should also be particularly emphasized that the recesses serving as coding elements are also provided and designed for the force-transmitting attachment of the shelf-rail device to the shelf rail. The recesses favourably serve a double purpose. The function of the force-transmitting fastening is achieved by positioning and dimensioning the recesses, which are adapted to the corresponding fastening means of the shelf-rail devices so that these fastening means can interact with the recesses in a force-transmitting manner and the shelf-rail device is held in its target position in the shelf rail.

The function as a coding element is achieved in the recesses by the fact that the recesses differ in terms of their shape and/or dimensions.

In order to obtain a clear distinctiveness of the coding elements, it is preferentially provided that all recesses differ from each other.

In order to ensure the simplest possible detection of the code transported with the aid of the coding element, it has also proven to be particularly efficient that the coding elements differ in terms of one, in particular only one, of their characteristics and that each characteristic occurs only once. With regard to the previously described recesses, this can preferably be the height of the respective recess. It should be assumed that the height is normally measured to the longitudinal extension of the shelf rail in the plane of the previously mentioned central wall of the shelf rail. This has the advantage that the arrangement of the recesses in the grid remains unaffected. In this embodiment type, for example, it can also be provided that a large part of the shape of the recesses remains unaffected by the coding and is thus unaffected for force-transmitting fastening and only a relatively small area of the recess comprises the coding by a height that differs from recess to recess. This embodiment type can be implemented, for example, by means of a slot having different lengths from recess to recess, which extends beyond the basic height dimension in the central wall of the shelf rail and into which a measuring rod or probe can be immersed according to the respective length of the slot.

In addition, it has proven to be particularly favourable if a measure characterizing the characteristic differs from one coding element to the next by only one unit of measurement. This dimension can be countered, for example, by a fraction of a millimetre or more, such as the order of a millimetre. This measure essentially corresponds to an implementation of the grey code known from digital technology on the shelf-rail system, in particular, its structural or mechanical form. In particular, this measure has the advantage that a position along the shelf rail can be easily coded in a robust manner, and, above all, faulty detections of the respective coding element can also be easily detected.

In contrast to the previous description, in which the shelf rail itself was used to code the position, in accordance with another embodiment type, which does not make any use of the shelf rail as a coding element, it can be provided that the sensor is installed in the shelf-rail device and is used to determine the distance along the shelf rail to a adjacent object in relation to the shelf-rail device. Such a embodiment type can be implemented, for example, by the fact that each shelf-rail device contains a time-of-flight sensor, which is essentially orientated parallel to the longitudinal extension of the shelf rail with regard to its transmission and reception characteristics and serves to determine the distance to the adjacent shelf-rail device or another object limiting the shelf rail. For example, if a first shelf-rail device is inserted into the shelf rail in the presence of a shelf-rail controller, the shelf-rail controller can be used to measure the absolute position of this first shelf-rail device. From now on, it is possible to check, using the shelf-rail controller as well as with the shelf-rail device used, whether another shelf-rail device is used either between the already used shelf-rail device and the shelf-rail controller or between the already used shelf-rail device and the end of the shelf rail. This measure, which repeatedly checks whether another shelf-rail device is used between two shelf-rail devices used at known positions, can be repeated for any number of shelf-rail devices up to the maximum loading of the shelf rail. However, this measure can also be used to determine that a shelf-rail device has been removed from the shelf rail because it changes the distance between two shelf-rail devices located at known positions, or the distance between the shelf-rail controller and the nearest shelf-rail device remaining in the shelf rail, or the distance from the shelf-rail device remaining in the shelf rail to the end of the shelf rail.

In accordance with a further embodiment type, it can also be provided that each shelf-rail device comprises at least one transmitter for inter-shelf-rail device communication as the sensor and that the respective shelf-rail device is designed to provide the result of communication and/or signal transmission between two adjacent shelf-rail devices for the purpose of determining the position and/or the sequential order. In this embodiment type, for example, it can be provided that each shelf-rail device for transmitting and receiving infrared signals is essentially designed in the plane of the shelf rail or parallel to the shelf rail. This makes it possible to establish signal transmission or information transmission from one adjacent shelf-rail device to the next. For example, the transfer of information can include the exchange of the identity of the immediately adjacent shelf-rail devices. The shelf-rail device that receives the identity of the adjacent shelf-rail device can also detect whether it is received from the left or the right side. In the case of the shelf-rail device that implements the shelf-rail controller, this reception can of course only take place from one side. The neighbouring relationship between the shelf-rail devices established in this way can be provided by any of the shelf-rail devices for further processing, for example, by the shelf-rail controller or by the central control device and is transmitted to these entities for further processing in a communication with them.

In accordance with a further embodiment type, it can also be provided that the sensor is designed to detect a signal propagating along the shelf rail, in particular to measure the time-of-flight of a mechanically excited signal, particularly preferred an acoustic signal.

Thus, the electrical signal propagation as such along the shelf rail, for example, along a bus system or a line, etc., can also be detected with the aid of an appropriately adapted sensor and, on the basis of the propagation parameters, such as the signal strength at the respective location of the shelf rail or the signal attenuation present there for example, or the timing of the signal propagation, such as the time offset between the transmission and the return transmission or receiving the return transmission or receiving a reflected signal, it can be used to determine the absolute position or relative position of shelf-rail devices along the shelf rail.

Preferably, however, the propagating signal is a signal generated by mechanical excitation that propagates along the shelf rail in the shelf rail. This signal can be generated, for example, by a vibration-generation device contained in the shelf-rail device. This vibration generation is started or triggered, for example, by another second shelf-rail device positioned at a distance from the first shelf-rail device, for example, by electronic communication between the two devices. The vibration-generation device of the first shelf-rail device guides the vibrations into the shelf rail, where it propagates along the shelf rail in the material of the shelf rail and the elapsed time from the start of the vibration generation (or its initiation of technical communication) to the arrival of the vibrations at the second shelf-rail device by the second shelf-rail device is measured.

Being particularly preferred, the vibration is an acoustic signal, i.e., a signal that can also be audible. Wherein, the property of audibility can be differentiated in such a way that this signal can be audible to animals but not to humans, or to animals and to humans alike. In the event that the signal is only audible to animals, this signal can be used not only to determine the position, but also to keep animals out of business premises. However, if the signal is also audible to humans, it can also be used for signalling, such as a fire alarm for example. The acoustic signal can be generated, for example, with the aid of a piezoelectric loudspeaker or, in general, a transducer installed in the respective shelf-rail device, in such a way that it is in contact with the shelf rail as far as possible in the case of the shelf-rail device inserted in the shelf rail in order to ensure optimal signal transmission to the shelf rail.

Being particularly preferred, the above-mentioned shelf-rail controller is used as that shelf-rail devices that starts or initiates signal transmission, which, incidentally, also addresses the other shelf-rail devices installed on the shelf rail, i.e., being able to selectively control them. However, if no shelf-rail controller is provided, the individual shelf-rail devices can also mutually start emitting the signal propagating in the shelf rail in order to determine their relative position on the shelf rail.

Each shelf-rail device designed to receive the signal propagating in the shelf rail comprises a signal receiver, which is also preferably positioned or designed to rest against the shelf rail in order to ensure problem-free, in particular, optimal signal detection. Preferably, such a signal receiver can be implemented with the aid of a piezoelectric MEMS microphone. MEMS stands for Micro-Electronic-Mechanical Systems. However, other, e.g., coil-based signal receivers can also be used.

In accordance with a special embodiment type, it had proven to be particularly favourable that the shelf-rail system comprises, as one of the shelf-rail devices, the shelf-rail control device which is designed to control at least one other shelf-rail device attached to the shelf rail; in particular also to supply electrical power to it; in particular, the other shelf-rail device is an electronic shelf-rail display or a shelf-rail camera or a shelf-rail-temperature and/or moisture-detection device or a shelf rail input unit. As mentioned, the shelf-rail control device can also be favourably involved in determining the absolute position(s) as well as relative positions of the other shelf-rail devices attached to the shelf rail and serve as a central shelf-rail gateway to make the shelf-rail-device configuration present on the shelf rail accessible to the central control device.

A particularly efficient and favourable embodiment with the shelf-rail control device exists if the shelf rail comprises a cable system, in particular, a cable system with exactly three conductors, wherein the shelf-rail control device is connected to the cable system and at least one other shelf-rail device contacts the cable system. The wired operation in the shelf rail enables a reliable determination of the position or sequential order for the shelf-rail devices, which can be carried out, in particular, unaffected by any external radio signals that can be present on the shelf rail where applicable.

Ultimately, it should be mentioned in general terms that the electronic devices described naturally comprise electronics. The electronics can be discrete or constructed by integrated electronics, or also a combination of both. Microcomputers, microcontrollers, application-specific integrated circuits (ASICs), possibly in combination with analogue or digital electronic peripherals, can also be used. Many of the mentioned functionalities of the devices are implemented—possibly in interaction with hardware components—with the aid of software that is executed on an electronics processor. Devices designed for radio communication usually comprise an antenna configuration for transmitting and receiving radio signals as part of a transceiver module. The electronic devices can also comprise an internal electrical power supply, which can be implemented, for example, with a replaceable or rechargeable battery. The devices can also be supplied in a wired manner, either by an external power supply or also by means of "Power-over-LAN".

These and other aspects of the invention result from the figures described below.

BRIEF DESCRIPTION OF THE FIGURES

The invention is explained in more detail below with reference to the attached figures on the basis of exemplary embodiments, to which, however, the invention is not limited. Thereby, identical components in the various figures are provided with identical reference numbers. Schematically, the figures show.

DESCRIPTION OF THE EXEMPLARY EMBODIMENTS

Figure 1:
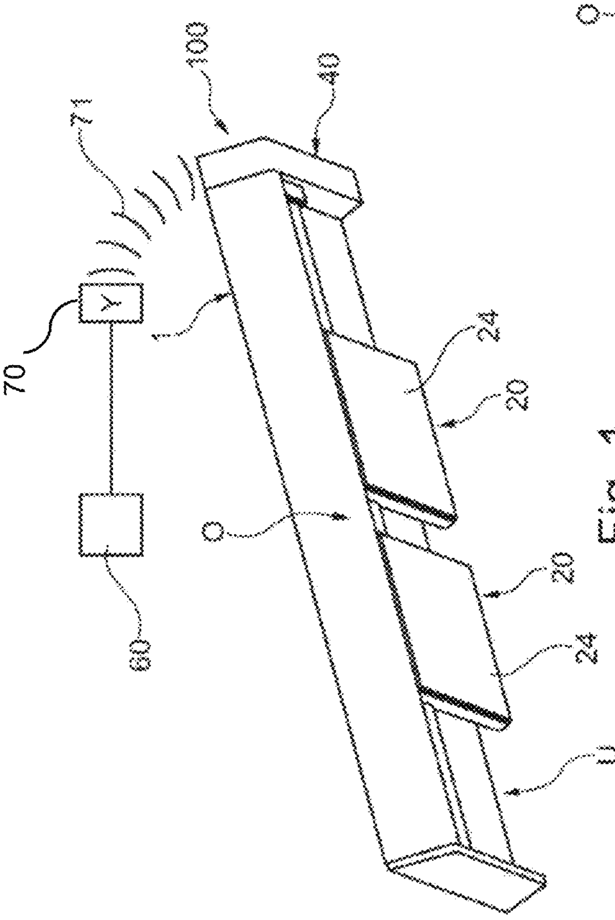
FIG. 1 a shelf-rail system according to the invention with three shelf-rail devices attached to a shelf rail in a view from the front diagonally.

FIG. 1 shows a shelf-rail system 100 which comprises a shelf rail 1 with three shelf-rail devices, namely an edge-mounted shelf-rail controller, hereinafter referred to as a controller 40, and two front-mounted shelf labels, hereinafter referred to as electronic display units 20, which are positioned along the longitudinal extension of the shelf rail 1 and which are used to display product and/or price information and for this purpose a screen 24 on their front, wherein the respective product and/or price information was transmitted to them by a server 60 connected by cable to an access point 70 by means of radio communication 71 of the access point 70 with the controller 40.

The display unit 20 comprises a display-unit electronics (not shown in detail). The controller 40 comprises controller electronics (not shown in detail). A cable carrier 5 is also at least partially visible in the illustration of FIG. 1, which carries three conductor pathways 6 (not visible here—but see FIG. 3), which form the electrical connection between the controller electronics and the display-unit electronics for communication between the controller 40 and the respective display units 20 and the electrical supply of the respective display units 20.

Figure 2:
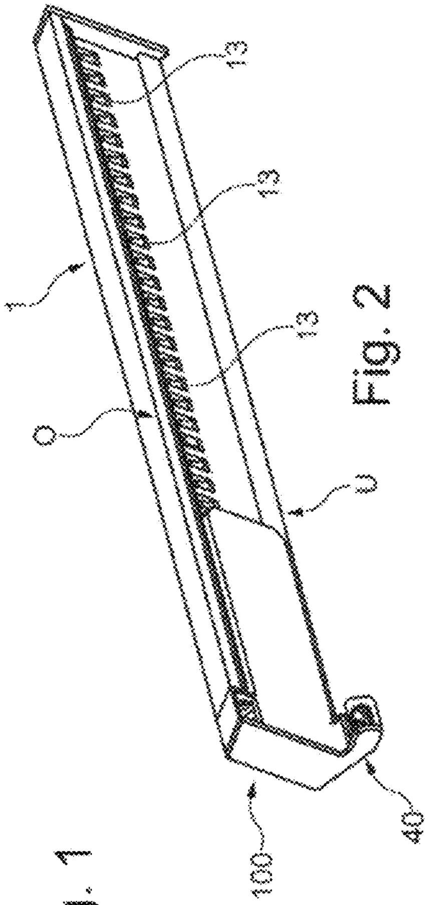
FIG. 2 the shelf-rail system in a view from the rear at an angle with visible recesses as mechanical coding elements.

FIG. 2 shows the shelf-rail system 100 from its back side, wherein in this view the display units 20 are not visible and the representation of the server 60 and the access point 70 and the radio communication 71 have been omitted. However, a sequential order of essentially rectangular recesses 13 arranged in the grid along the longitudinal extension of the shelf rail 1 is clearly visible in this illustration, which serve to mechanically fasten the display units 20 as well as to determine the position of the respective display unit 20 along the longitudinal extension of the shelf rail 1.

In FIGS. 1 and 2, the top side O and the bottom side U are also shown in relation to the shelf-rail system 1 in order to be able to refer to them by means of "above" and "below" respectively.

The recess 13 are slightly different with regard to their height H (see FIG. 4), wherein the height H increases by approx. 0.1 mm from one recess 13 to the next recess 13 starting from an initial height on the edge side of the shelf rail 1. Here, all the upper edges of the recesses 13, which are orientated towards the top side O, are aligned with a line or plane. The different heights of the recesses 13 thus extend towards the bottom side U. Of course, these slight differences in height are not visible in detail in the schematic illustration of the figures but can be detected using a sensor 99 of the display unit 20, which will be described below.

Figure 3:
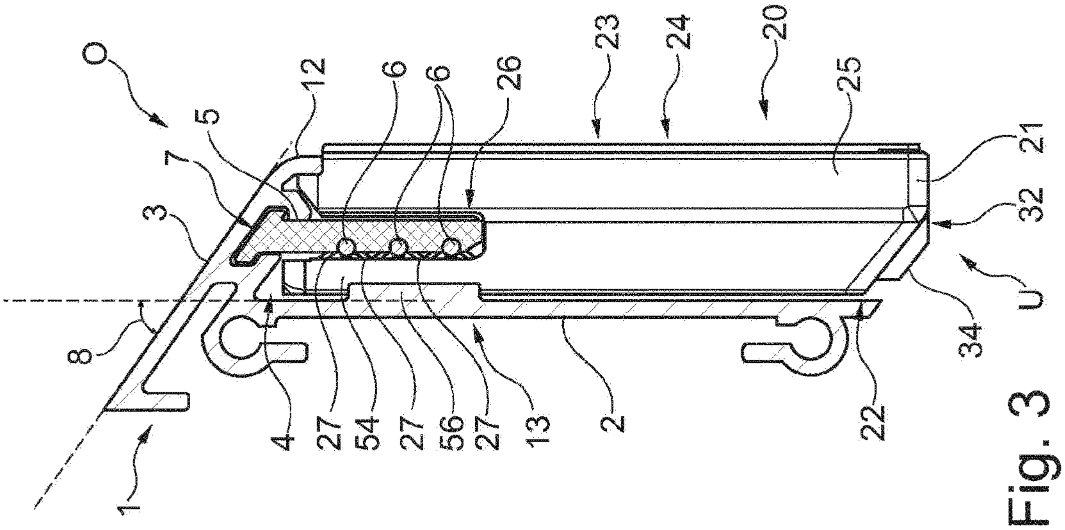
FIG. 3 a shelf-rail device fully inserted into the shelf rail is viewed in a lateral view along the shelf rail.

FIG. 3 shows in detail the interaction of one of the display unit 20 with the shelf rail 1, wherein the shelf rail 1 was sectioned laterally next to the display unit and the display unit 20 is completely inserted into the shelf rail 1.

The shelf rail 1 comprises a first boundary wall 2 (reference wall 2), which is shown vertically in the figure.

At its upper end, the first boundary wall 2 or reference wall 2 merges into a second boundary wall 3. In this exemplary embodiment, the second boundary wall 3 and the reference wall 2 are made of one piece, e.g., steel or aluminium.

Between the reference wall 2 and the second boundary wall 3, there is a captured area 4 delimited on both sides by these walls 2 and 3 for accommodating the display unit 20.

On the side of the display unit 20, i.e., measured in the spatial region of the captured area 4, an acute angle 8 with about 53° is formed between the reference wall 2 and the second boundary wall 3.

The second boundary wall 3 comprises a receiving shaft 7 in which the cable carrier 5 is inserted, which is designed as a cable carrier plate. The cable carrier 5 is adapted to the shape of the receiving shaft 7 on the side that is inserted into the receiving shaft 7, i.e., it is essentially T-shaped. The cable carrier 5 can normally be moved out of or into the image plane of FIG. 1 in the receiving shaft 7 in order to insert it there or also to remove it from there.

The conductors 6 supported by the cable carrier 5 are each made of a single-core copper wire 6 and are designed without an insulation layer. More than 50% of the crosssection of wire 6, about two-thirds of the radial dimension, is embedded in the cable carrier 5. In this case, the wire 6 that is closest to the second boundary wall 3 is the power supply line, the middle line 6, the signal supply line and the line path 6 that is furthest away from the second boundary wall 3 is the reference potential line. The wires 6 are arranged on the side of the cable carrier 5 facing the reference wall 2 and form the lines of a bus system of the shelf rail 1.

The cable carrier 5 and the reference wall 2 each comprise a first dimension (longitudinal extension), which represents the length measured from the image plane or into the image plane, wherein in this exemplary embodiment both are the same size and are exemplarily about 1.5 m long. However, other lengths can also be provided for shelf rail 1.

The cable carrier 5 comprises a second dimension (height) that represents the vertical expansion of the cable carrier 5. Correspondingly, the reference wall 2 comprises a third dimension (height), which indicates the vertical extent of the reference wall 2 in FIG. 1. In this exemplary embodiment, the second dimension of the cable carrier 5 is approximately 40% of the third dimension of the reference wall 2. The second dimension in this exemplary embodiment is about 3 cm. In this exemplary embodiment, cable carrier 5 is made of insulating polypropylene by injection moulding, wherein the wires 6 were already embedded during the manufacturing method of cable carrier 5.

The second boundary wall 3 comprises a nib- or hook-shaped edge area 12 at the end, which, when the display unit 20 is inserted, extends over this head side.

The display unit 20 is positioned in FIG. 1 in such a way that it can be inserted from below into the shelf rail 1 in the direction of the second boundary wall 3 upwards with a rectilinear movement parallel to the reference wall 2.

The display unit 20 comprises a housing 21 with a rear wall 22. The rear wall 22 represents that part of the housing 21 which is closest to the reference wall 2 when inserted into the shelf rail 1. On the side opposite the rear wall 22 there is a front panel 23 that comprises the screen 24. The front wall 23 comprises a step at its upper end, which is designed to accommodate the edge area 12 of the shelf rail 1. Between the front wall 23 and the rear wall 22, the housing 21 is formed by a side wall 25. The side wall 25 running along the top side of the display unit 20 comprises a cable support groove 26, the vertical walls of which are essentially parallel to the rear wall 22. The cable carrier groove 26 is provided to accommodate the cable carrier 5 and is dimensioned adapted to its dimensions.

The housing 21 comprises housing openings in the cable carrier groove 26 on the rear wall side through the contacts projecting from the housing 21 into the cable carrier groove 26. The contacts are implemented by a group of metallic contact strips 27. Each contact strip 27 comprises a first end section soldered to the display-unit electronics. Furthermore, the contact strip 27 comprises a second end section, which is formed or formed for contacting with one of the wires 6. The second end section comprises a raised shape as a contact zone.

Figure 4:
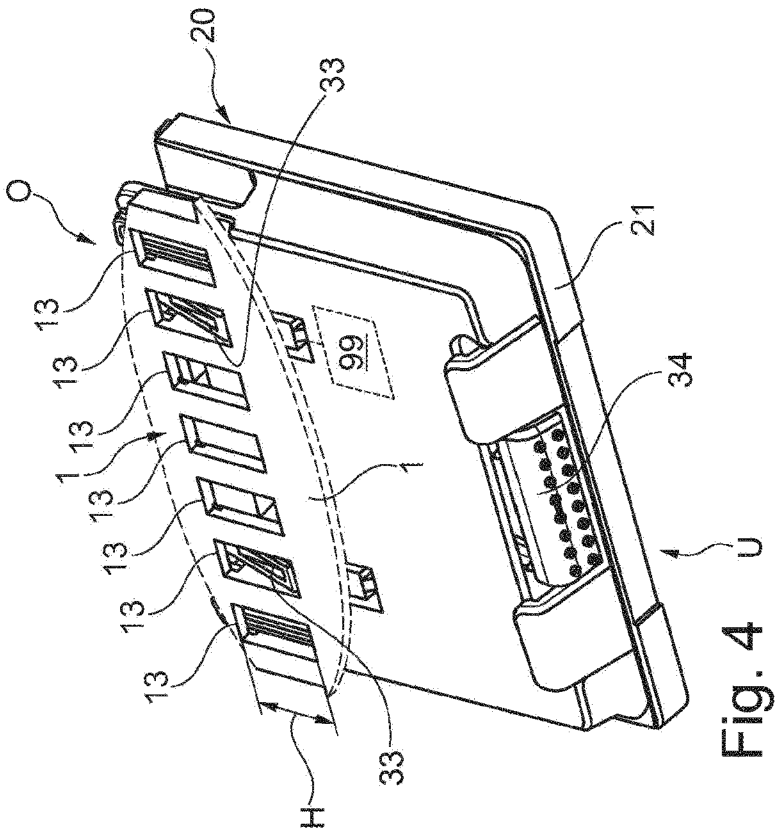
FIG. 4 the mechanical interaction between the recesses and the shelf-rail device.

FIG. 4 shows a section of shelf rail 1 and display unit 20 from its back side. Each display unit 20 comprises a fastening mechanism, of which only two fastening hooks 33 and a knob 34 coupled thereto can be seen outside the housing of the display unit 20. The rear wall 22 comprises mounting housing openings through which the fastening hooks 33 project. When the button 34 is not pressed, a spring installed internally in the housing presses the fastening hooks 33 downwards against the lower end of the recesses 13, wherein the display unit 20 is pressed or moved upwards into the shelf rail 1. The fastening hooks 33 can be moved downwards according to the respective height of the recess.

Hereby, the width of the movement of the fastening hooks 33 is detected by means of a sensor 99, which provides a conversion of the mechanical movement of the fastening hooks 33 into an electrical signal, which is detected by means of the display-unit electronics and transmitted to the shelf-rail controller 40 by means of a digital representation thereof by communication via the cable pathways 6, where the controller electronics determine or decode the absolute position of the respective display unit, thereby knowing the individual height of each dimension at the respective position along the shelf rail and the signal value to be expected there (or its expected value range) of the sensor. The shelf-rail controller 40 can transmit the absolute position along the shelf rail 1 determined in this way by radio to the server, where this position is noted with knowledge of the affected shelf rail 1, which is clearly determined by the detection of the communicating shelf-rail controller 40, because this connection between the shelf rail 1 and the shelf-rail controller 40 is predefined.

The sensor 99 can detect the movement of both fastening hooks 33 or only a single fastening hook 33.

Figure 5:
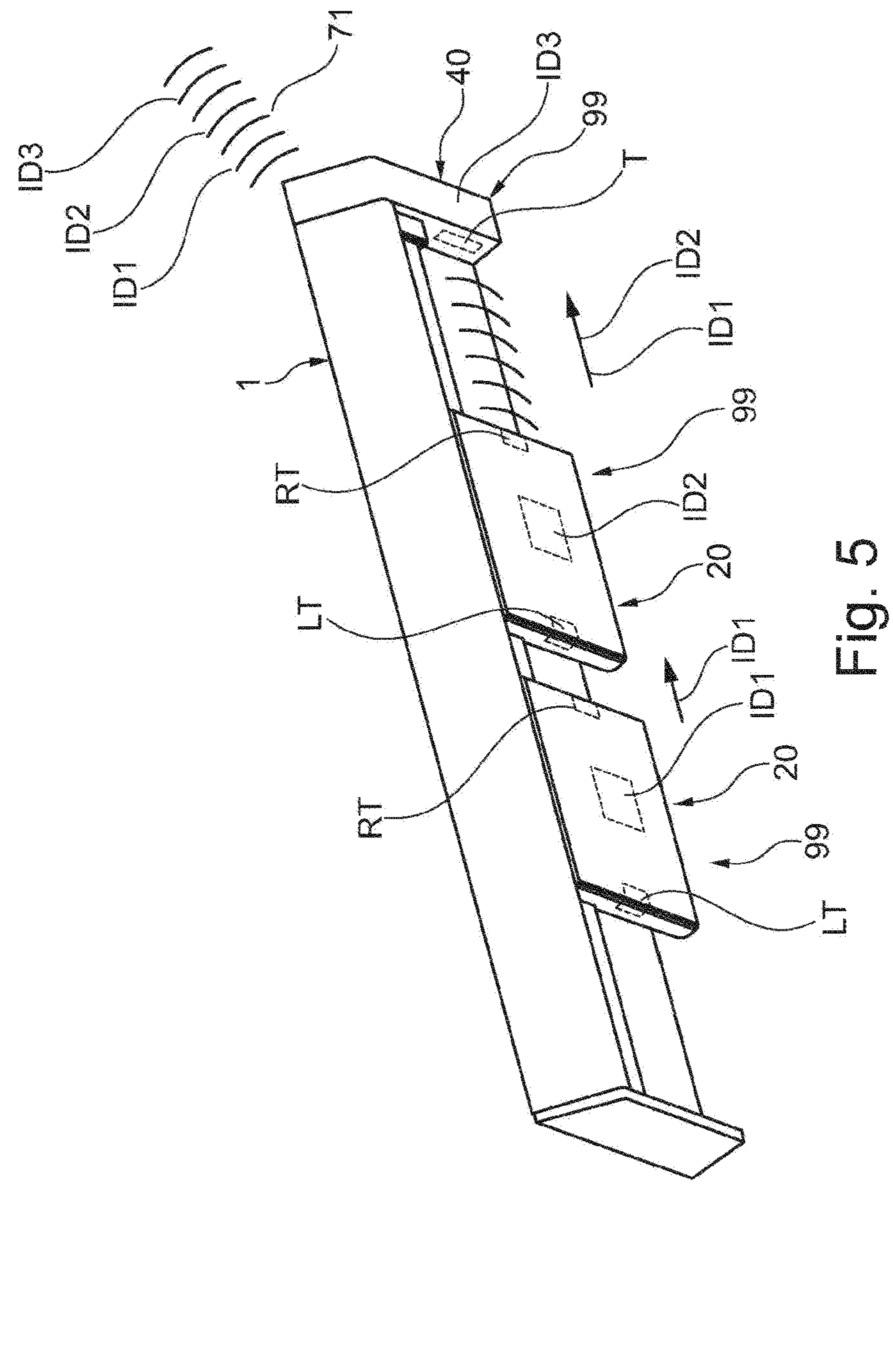
FIG. 5 the shelf-rail system with an embodiment for determining the sequential order of the two shelf-rail devices fixed along the front of the shelf rail.

In addition, FIG. 5 has been described, in which a embodiment type of the shelf-rail system 100 for determining the sequential order of the display units 20 attached to the front of the shelf rail 1 is described. In this embodiment type, each display unit 20 comprises a left-side transmitter LT and a right-side transmitter RT as sensor 99. This is therefore provided to enable unidirectional communication between the display units 20 installed at the front of the shelf rail 1. If this is not necessary, for example, the left-side transmitter LT can only be designed as a receiver and the right-side transmitter RT only as a transmitter. The shelf-rail controller 40 also comprises a transmitter T as sensor 99, for which the analogue considerations apply, i.e., if it is only used for receiving, it can also only be designed as a receiver. Each shelf-rail device 20 and 40 is identified by a unique code ID1, ID 2 and ID3, which is stored in the respective electronics of the shelf-rail device 20 and 40. The LT, RT and T transmitters are designed for infrared light-based communication.

In order to determine the sequential order of the display units 20 attached to the front of the shelf rail 1, the shelf-rail controller 40 controls the display units 20 into an sequential-order determination mode. In this mode, each of the display units 20 sends its unique code ID1 and ID2 via its right-hand transmitter RT to the adjacent shelf-rail device, i.e., either to the right-hand display unit 20 or to the shelf-rail controller 40. Insofar as a code is also received via the left-side transmitter TL from a shelf-rail device positioned on the left side, as is the case with the right-hand display unit 20, this received code ID1 is also emitted via the right-hand transmitter RT of the right-hand display unit 20 and marked as a code ID1 received on the left side.

Generally speaking, this type of communication increases the number of codes communicated from display unit 20 to display unit 20, wherein it is also indicated here that it is one or a plurality of codes obtained on the left side, which are emitted on the right side together with a display unit's 20 own code.

Ultimately, in the present example, the shelf-rail controller 40 receives all two codes ID1 and ID2 with an indication of their sequential order, which immediately results in the sequential order of the display units 20 on the front of the shelf rail 1. The shelf-rail controller 40 communicates this result together with its own code ID3 in a radio communication 71 to the server 60, where this sequential order is stored for the relevant shelf rail 1.

Ultimately, it is pointed out once again that the figures described in detail above are only exemplary embodiments, which can be modified by the person skilled in the art in various ways without leaving the field of the invention. For the sake of completeness, it is also pointed out that the use of the indefinite article "a" does not exclude that the respective features can also be present a multiple of times.

The invention claimed is:

1. Shelf-rail system, which comprises a shelf rail and at least one shelf-rail device attached to the shelf rail, wherein the shelf-rail system comprises at least one sensor which is provided and designed to automatically determine the position of at least one of the at least one shelf-rail device attached to the shelf rail along the longitudinal extension of the shelf rail and/or to automatically determine the sequential order of at least two shelf-rail devices attached to the shelf rail along the longitudinal extension of the shelf rail, and wherein the sensor is designed to detect a signal propagating along the shelf rail to measure the time-of-flight measurement of a mechanically excited signal.

2. Shelf-rail system according to claim 1, wherein the sensor is installed in the shelf-rail device and is designed to detect at least one coding element of the shelf rail.

3. Shelf-rail system according to claim 2, wherein the sensor is designed for mechanical, electrical, or optical detection of the at least one coding element.

4. Shelf-rail system according to claim 3, wherein the sensor is designed for electrical detection of the coding elements, the electrical detection being resistive or inductive or capacitive.

5. Shelf-rail system according to claim 1, wherein the sensor is installed in the shelf-rail device and is used to determine the distance along the shelf rail to an adjacent object with respect to the shelf-rail device.

6. Shelf-rail system according to claim 1, wherein the mechanically excited signal is an acoustic signal.

7. Shelf-rail system according to claim 1, wherein the shelf- rail system comprises, as one of the shelf-rail devices, a shelf-rail control device which can be used to control at least one other shelf-rail device attached to the shelf rail.

8. Shelf-rail system according to claim 7, wherein the shelf rail comprises a cable system, wherein the shelf-rail control device is connected to the cable system and at least one other shelf-rail device contacts the cable system.

9. Shelf-rail system according to claim 8, wherein the cable system comprises exactly three conductors.

10. Shelf-rail system according to claim 7, wherein the shelf-rail control device can be used to supply electrical power to the at least one other shelf-rail device, and the other shelf-rail device is an electronic shelf-rail display or a shelf-rail camera or a shelf-rail-temperature and/or moisture-detection device or a shelf-rail input unit.

11. Shelf-rail system, which comprises a shelf rail and at least one shelf-rail device attached to the shelf rail, wherein the shelf-rail system comprises at least one sensor which is provided and designed to automatically determine the position of at least one of the at least one shelf-rail device attached to the shelf rail along the longitudinal extension of the shelf rail and/or to automatically determine the sequential order of at least two shelf-rail devices attached to the shelf rail along the longitudinal extension of the shelf rail, wherein the sensor is installed in the shelf-rail device and is designed to detect a plurality of coding elements of the shelf rail, and wherein the coding elements are formed by recesses in the shelf rail, along the longitudinal extension of the shelf rail.

12. Shelf-rail system according to claim 11, wherein the recesses are formed in a grid.

13. Shelf-rail system according to claim 11, wherein the recesses are provided and designed for the force-transmitting fastening of the shelf-rail device to the shelf rail.

14. The shelf-rail system according to claim 11, wherein the recesses differ in shape and/or dimensions.

15. Shelf-rail system according to claim 14, wherein all the recesses differ from each other.

16. Shelf-rail system according to claim 11, wherein the shelf rail comprises at least one shelf-rail wall and the coding elements are formed in at least one of the at least one shelf-rail wall.

17. Shelf-rail system, which comprises a shelf rail and at least one shelf-rail device attached to the shelf rail, wherein the shelf-rail system comprises at least one sensor which is provided and designed to automatically determine the position of at least one of the at least one shelf-rail device attached to the shelf rail along the longitudinal extension of the shelf rail and/or to automatically determine the sequential order of at least two shelf-rail devices attached to the shelf rail along the longitudinal extension of the shelf rail, wherein the sensor is installed in the shelf-rail device and is designed to detect a plurality of coding elements of the shelf rail, and wherein the coding elements differ in terms of one of their characteristics and each characteristic occurs only once.

18. Shelf-rail system according to claim 17, wherein a measure characterizing the characteristic differs by only one unit of measurement from one coding element to the next.

19. Shelf-rail system according to claim 17, wherein the coding elements differ in only one of their characteristics.

20. Shelf-rail system, which comprises a shelf rail and at least one shelf-rail device attached to the shelf rail, wherein the shelf-rail system comprises at least one sensor which is provided and designed to automatically determine the position of at least one of the at least one shelf-rail device attached to the shelf rail along the longitudinal extension of the shelf rail and/or to automatically determine the sequential order of at least two shelf-rail devices attached to the shelf rail along the longitudinal extension of the shelf rail, and wherein each shelf-rail device comprises at least one transmitter as the sensor for inter-shelf-rail device communication and the respective shelf-rail device is designed to provide the result of a communication and/or signal transmission between two adjacent shelf-rail devices for the purpose of determining the position and/or sequential order.

* * * * *